Aug. 23, 1938.  I. C. RINN  2,127,940

MOUNT FOR FILMS AND THE LIKE

Filed March 8, 1938

Inventor:
Irwin C. Rinn,
by Thos. A. Banning
Atty.

Patented Aug. 23, 1938

2,127,940

UNITED STATES PATENT OFFICE 2,127,940

MOUNT FOR FILMS AND THE LIKE

Irwin C. Rinn, Chicago, Ill.

Application March 8, 1938, Serial No. 194,626

7 Claims. (Cl. 40—159)

This invention relates to improvements in mounts for films and the like, that is, mounting devices into which films may be set or inserted for examination. The invention has reference especially to mounts for small films such as are used in X-ray work, but manifestly the features of the invention may also be used in connection with mounts for larger films, and for other purposes.

The general form and type of mount to which the present invention relates is similar to that disclosed in Letters Patent of the United States, No. 2,014,743, issued September 17, 1935, on the application of Metzler and Ronsheim, for improvements in mount for films and the like, and I have herein shown and shall describe the present invention as applied to such a mount, but it will appear that the features of the invention are not to be limited to such mounts, except as I may do so in the claims to follow.

In film mounts of the form disclosed in the aforesaid Metzler and Ronsheim patent there are provided at least two companion and integrated sheets or layers of thin cardboard which are provided with companion openings, and the film to be examined is inserted with its edge portions between said sheets and at the location of said openings, so that the edges of the film, or certain of said edges, are gripped, leaving the body and central portion of the film exposed for examination by transmitted light. In the arrangement of that patent, one of the openings is enlarged at the insertion end of the opening, so that the edge portions of the film may be properly inserted between the companion sheets or layers. There is also provided a free or uncemented border at the edge of the opening opposite to the insertion edge, so that when the film has been so inserted its said opposite end will be gripped, as well as the sides of the film; but no provision was made for ensuring a gripping of the end portion of the film at the insertion end of the opening. Consequently, films placed in such a mount are gripped only on their two sides and on one end, but the other end is not gripped, but is free to move back and forth transversely of the thickness of the film. This is a disadvantage, since the films so mounted may be so displaced as to become released from the mount, or so that their edges become caught against the edges of the mount opening, and the films as well as the mount frequently become torn or ragged, and they cannot be as well examined as would be the case if their four edges were gripped with equal firmness around the entire periphery of the film.

The main object of the present invention is to provide in mounts of the general type just referred to means for ensuring that the films shall be gripped around their entire peripheries with substantially equal firmness. In this connection it is an object to make provision for such complete gripping action by providing for a first insertion in one direction an extra distance, and for thereafter backing up the film movement so as to bring its opposite end portion into engagement with a reception slot at the insertion end of the opening, so that when the film is so inserted and then backed up a slight amount of it will be completely gripped around its entire periphery.

A further feature is to make provision for the necessary slot to receive said end portion of the film, such slot being provided by leaving the top border portion of the sheets or layers uncemented or unconnected together; and also, in this connection, to make the slot at the opposite end of the opening of sufficient depth to enable the film to be originally inserted the needed extra distance to permit the initial extra insertion of the film so that when the backing operation is performed to bring the final end portion of the film into gripping engagement with the slot at the insertion end, the end of the film first inserted will still be gripped and retained by a portion of the slot of extra depth.

It is a further object of the invention to incorporate the features thereof in mounts made of either two or three thicknesses of paper or cardboard or other material, as will be hereinafter explained.

Other objects and uses of the invention will appear from a detailed description of the same, which consists in the features of construction, and combinations of parts hereinafter described and claimed.

Figures 1, 4, 5, 7:
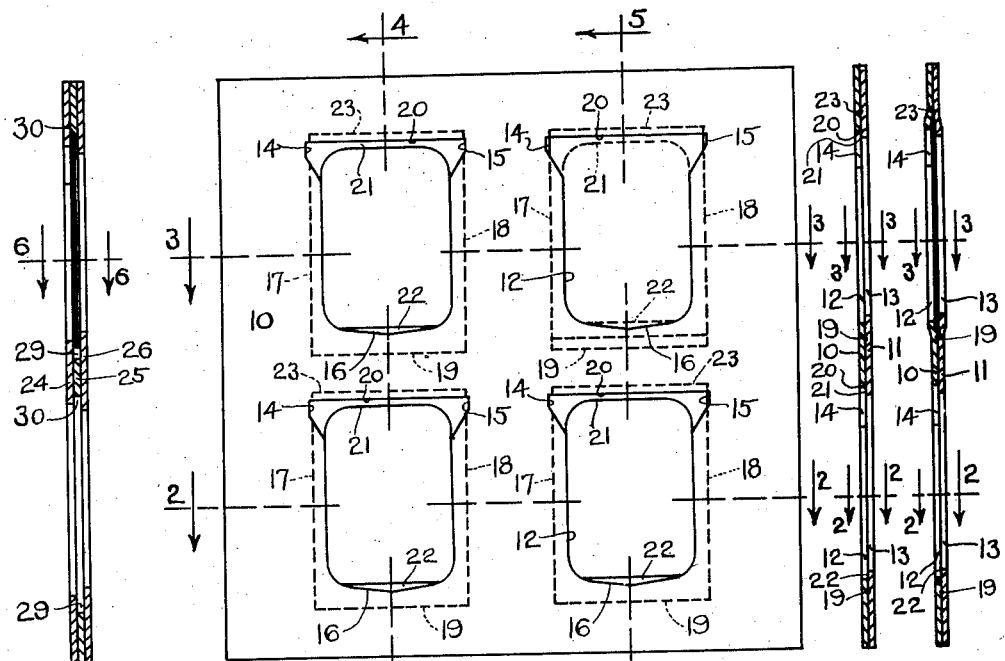
Figure 1 shows a face view of a film mount incorporating the features of the present invention, said mount including four film openings, and there being a film located in one of the openings.
Figure 4 shows a vertical section on the lines 4—4 of Figures 1, 2 and 3 looking in the directions of the arrows.
Figure 5 shows a vertical section on the lines 5—5 of Figures 1, 2 and 3 looking in the directions of the arrows.
Figure 2:
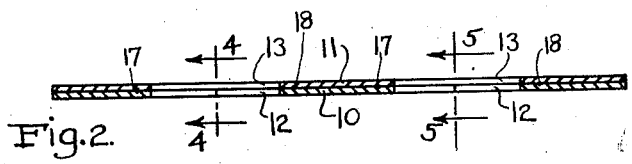
Figure 2 shows a cross section on the lines 2—2 of Figures 1, 4 and 5, looking in the directions of the arrows.
Figure 3:
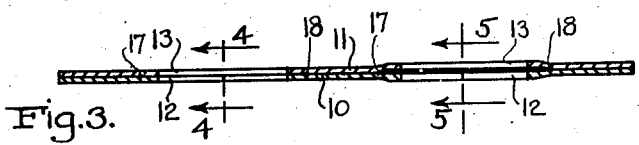
Figure 3 shows a cross section on the lines 3—3 of Figures 1, 4 and 5, looking in the directions of the arrows.
Figure 6:
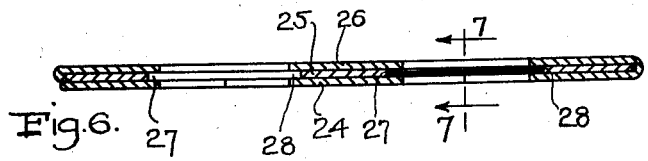

Figures 1 to 5 inclusive illustrate the present invention as incorporated in a two sheet or layer mount;

Figure 6 shows a cross section similar to that of Figure 3 but showing a three sheet or layer mount; and Figure 7 shows a vertical section similar to that of Figure 5 but showing a three sheet or layer mount.

Referring first to the construction shown in Figures 1 to 5, the same includes the top and bottom sheets or layers of suitable material, such as thin cardboard, 10 and 11, respectively. These are glued or cemented face together with the exception of the border portions presently to be explained. Each of these may be considered as the front or top sheet, but for simplicity I shall herein refer to the sheet 10 as the top or front sheet, but in so doing I do not limit the use of the film mount itself. These sheets are also provided with the companion sets of openings 12 and 13, so that when the sheets are cemented together in the proper manner, said openings come into registry as shown, and constitute the film exposure openings. Preferably the opening 12 in the top or front sheet is of enlarged width at its upper or film insertion end, as shown at 14 and 15 in Figure 1, so that the total width of said opening at the insertion end is at least as great as the width of the film to be inserted therethrough, and generally slightly greater than such film width. Also, the bottom end of the opening in the top or front sheet may be cut on a slant as shown at 16 in Figure 1 so as to make it possible to readily insert the bottom end of the film into the bottom slot or border portion presently to be described. Also, the corners of the openings may be rounded as shown.

The two sheets or layers are cemented face together, with the exception that they are not cemented together along the side edges of the opening, backwardly or laterally from said opening, as shown by the lines 17 and 18; thereby leaving both borders of the opening uncemented together, and leaving slots or portions of the mount between which the edges of the film may be slid during the insertion operation. It is noted that these lines 17 and 18 substantially register with the extreme portions of the enlarged insertion end of the opening as shown at 14 and 15, so that the distance between the lines 18 and 17 is at least as great as the width of the film to be accommodated.

The uncemented portion or border is also carried across the inner or inserted end of the opening as shown by the line 19 in Figure 1, so that there is left a sufficient distance at the lower or inserted end of the opening to fully accommodate the length of the film end necessary in order to fully insert the film into place. Usually the upper end of the opening in the top or front sheet is carried slightly further than the opening in the bottom or back sheet, as shown at 20 in Figure 1, so that there is left a lip 21 of the back sheet to support the back face of the upper portion of the inserted film. A similar lip 22 is left at the lower portion of the opening due to the form on which the lower edge 16 is cut in the top sheet, as already referred to.

It will be noted that the distance between the edge 20 of the top sheet opening and the line 19 which defines the lower edge of the cementing operation, should be at least as great as the length of the film to be accommodated; and that with the arrangement so far described, when the film is fully inserted with its lower end against the line 19, the film can then be laid down flat into place, but without any support for its upper or finally inserted end. As already explained this is a disadvantage, since films so mounted do not have support for such end portion, and only on their sides and one end; and a film so mounted may be pressed bodily outwards or distorted, and frequently by such action its edge portions will become caught against the edges of the opening, so that either the film or the edge of the opening, or both, become ragged and torn, and sometimes the film is so damaged as to be further useless. But of even more importance, a film so incompletely supported is readily dislodged from the mount by a slight pressure against the film; and films so incompletely supported are frequently lost or misplaced. Also, due to such distortion, due to lack of complete support the film cannot be as accurately examined as otherwise is possible.

In order to overcome the foregoing disadvantage, I provide, as an object of the present invention, a top border or edge portion uncemented to the line 23, so as to thereby leave a slot or uncemented portion at the top or insertion end of the opening, as well as at the bottom end thereof; and generally the depth or size of the slot to the line 19 is double the depth or size of the slot to the line 23, so that by first fully inserting the film against the line 19, it can then be laid down flat into the opening, and against the lip 21, and then the film may be shifted up to bring its upper end against the line 23, the length of the film being such that when this backward movement has been completed the bottom end of the film will still be held or gripped, and also its top end. In other words, the arrangement is such, taking account of the length of the film itself, that the film may first be fully inserted and laid flat, and then it may be backed up, and still both its top and bottom ends will be gripped in the slots or uncemented portions between the two sheets.

Actually, in practice, the thickness of the film is so small that it can be readily slipped into place between the uncemented borders in the manner explained above, and the border portions of the sheets will yield or deflect slightly, as shown in exaggerated form in Figures 3 and 5, in which figures, as well as the other sections, the thicknesses of the sheets are shown exaggerated.

In the modified arrangement shown in Figures 6 and 7, the mount comprises in effect three thicknesses, namely, 24, 25 and 26; being formed of a three panel blank which when folded with one edge panel between the other edge panel and the central panel, forms the completed mount as shown, and according to certain of the teachings of the aforesaid Letters Patent, No. 2,014,743. In such case, the openings in the central and one of the edge panels are smaller than the opening in the other edge panel, so that when the panels are brought face to face there is established the border slot or groove to accommodate the edge portions and the ends of the film. In the modified arrangement of Figures 6 and 7 the side borders are shown at 27 and 28, and the bottom groove at 29; and the top groove of the present invention is shown at 30 in Figure 7. It will be noted that the bottom groove 29 is deeper than the top groove 30, so that the film of proper length may be fully inserted with its lower end against the floor of the groove 29, to thereby permit the film to be laid flat against the lip 21, and then the film may be backed up to bring its top edge portion into the groove 30 as well shown in Figure 7.

While I have herein shown and described only certain embodiments of the features of my present invention, still I do not intend to limit myself thereto, except as I may do so in the claims to follow.

I claim:

1. As a new article of manufacture, a mount for films and the like, comprising a pair of sheets of stiff material set face to face, said sheets being provided with companion registering openings constituting a film exposure opening or window, one of said openings being longer than the other to establish a lip of the other opening at one end of said window, and said opening being of increased width at each side of said end to establish an insertion aperture, said aperture being of width at least as great as the film to be inserted into the mount, together with a cementitious connection between the sheets, said connection being continuous with the exception of an unconnected border at each side of the window, and of width substantially as great as the insertion aperture aforesaid, and with the exception of an unconnected border at each end of the window, the said border at the insertion aperture end being of less dimension lengthwise of the window than the said border at the opposite end of the window, whereby a film may be inserted lengthwise through the insertion aperture until completely inserted, and whereby said film may then be moved backwardly to bring its last inserted end portion into the said unconnected border at the insertion aperture end, substantially as described.

2. As a new article of manufacture, a mount for films and the like, comprising a pair of sheets of stiff material set face to face, said sheets being provided with companion openings constituting a film exposure opening or window, one of said openings having a film insertion enlargement at one end, said companion openings being of the same width throughout the major portion of their length, and the film insertion enlargement extending beyond the opening of the other sheet to thereby establish a lip at the film insertion end of the window, together with a cementitious connection between the sheets, said connection being substantially continuous with the exception of an uncemented border around the window, said border at the sides of the window being of width to accommodate the full width of the film when the film is inserted between the sheets, said border at one end of the window being of depth sufficient to accommodate the full length of the film with the last inserted end of the film lying against the lip aforesaid, and said border also including a portion extending across the insertion end of the window, whereby the film may first be fully inserted between the side borders and to the extreme end of the first mentioned end border, and may thereafter be backed up to thereby bring its last inserted end portion into the last mentioned end border, substantially as described.

3. As a new article of manufacture, a mount for films and the like, comprising a pair of sheets of stiff material set face to face, said sheets being provided with companion openings constituting a film exposure window or opening, one of said openings being of greater length than the other to establish a lip against the other sheet at one end of the window, and the opening of said end of the window also being of increased width at greater length also being of increased width at a point adjacent to said lip, to thereby establish a film insertion aperture, the sheets being connected together with the exception of a border portion surrounding the window, said border being at each side of the window of a width to accommodate the full width of the film when the film is inserted in place in the window, and the border extending across the insertion aperture end of the window and also across the opposite end of the window, said last named end portion of the border being of sufficient dimension measured lengthwise of the window to fully accommodate the film when inserted and laid against the lip aforesaid, and the end portion of the border at the insertion end of the window serving to receive the end portion of the film when the film is backed up thereinto, substantially as described.

4. As a new article of manufacture, a mount for films and the like, comprising a pair of sheets of stiff material set in opposition to each other, said sheets being provided with companion openings constituting a film exposure opening or window, said openings being of substantially the same width and with their side edges in alignment, and one of the openings being of greater length than the other opening to thereby establish a lip against the sheet with the opening of lesser length at the film insertion end of the window, said sheet with the opening of greater length also having provision for insertion of a film into the window at the end thereof adjacent to said lip, means to retain the sheets in co-ordination as aforesaid, said means leaving an unconnected border around the window, said border at the sides of the window being of width at least as great as the width of the film, said border extending across the film insertion end of the window, and also extending across the opposite end of the window, said last named end portion of the border being of sufficient dimension lengthwise of the film to permit full insertion of the film through the insertion end of the window and with the end portion of the film against the lip aforesaid, and whereby the film may thereafter be backed up to bring its last inserted end portion into the end border portion adjacent to the lip, substantially as described.

5. As a new article of manufacture, a mount for films and the like, comprising a pair of sheets of stiff material set in opposition to each other, there being window openings in the sheets, means to retain the sheets in co-operative relationship with their openings in registry with each other, said means being discontinuous around the opening to thereby establish a border around to the window for engagement with the edge portion of an inserted film, said border at the sides of the film window being of dimension to receive the full width of the inserted film, the opening in one sheet at one end being of the full width of said border to permit insertion of a film at that point, and the border portions at the ends of the window opening being of dimension to permit full insertion of the length of the film with the last inserted end portion of the film moved past the insertion end of the window opening, and whereby the film may thereafter be backed up to bring its last inserted end portion into the border at the insertion end of the window opening, substantially as described.

6. As a new article of manufacture, a mount for films and the like, comprising a pair of sheets of stiff material set in opposition to each other, there being window openings in the sheets, means to retain the sheets in co-operative relationship, said means being discontinuous around the window to thereby establish a film edge engaging border, one sheet having means through which the film is inserted endwise between the sheets, and the window opening at the opposite end of one of the sheets slanting with respect to the direction of film insertion, whereby as the film end reaches said end of the window opening the engagement of said film end with the end of the window opening is progressive across the window opening during the final stages of film insertion, substantially as described.

7. As a new article of manufacture, a mount for films and the like, comprising a pair of sheets of stiff material set in opposition to each other, there being window openings in the sheets, means to retain the sheets in co-operative relationship, said means being discontinuous around the window to thereby establish a film edge engaging border, one sheet having means whereby the film may be inserted endwise between the sheets, and the window opening at the opposite end of one of the sheets being of V-shape with respect to the direction of film insertion, whereby as the film reaches said end of the window opening the engagement of said film end with the end of the window opening is progressive from both sides of the window opening towards the center of the said end of the opening, substantially as described.

IRWIN C. RINN.